(12) United States Patent
Korhonen (10) Patent No.: US 11,524,730 B2
(45) Date of Patent: Dec. 13, 2022

(54) TRACK ASSEMBLIES FOR TERRAIN GOING VEHICLES AND METHOD FOR REPAIRING THE TRACKS

(71) Applicant: RUD Ketten Rieger & Dietz GmbH u. Co. KG, Aalen (DE)

(72) Inventor: Marko Korhonen, Kuopio (FI)

(73) Assignee: RUD KETTEN RIEGER & DIETZ GMBH U. CO. KG, Aalen (DE)

( * ) Notice: Subject to any disclaimer, the term of this patent is extended or adjusted under 35 U.S.C. 154(b) by 191 days.

(21) Appl. No.: 16/632,551

(22) PCT Filed: Sep. 26, 2017

(86) PCT No.: PCT/FI2017/050676
§ 371 (c)(1),
(2) Date: Jan. 21, 2020

(87) PCT Pub. No.: WO2019/016431
PCT Pub. Date: Jan. 24, 2019

(65) Prior Publication Data
US 2020/0156719 A1     May 21, 2020

(30) Foreign Application Priority Data
Jul. 21, 2017   (FI) .................................. U20174189
Jul. 21, 2017   (WO) .................. PCT/FI2017/050551

(51) Int. Cl.
*B62D 55/04*       (2006.01)
*B60C 27/20*       (2006.01)
(Continued)

(52) U.S. Cl.
CPC .............. *B62D 55/04* (2013.01); *B60C 27/20* (2013.01); *B62D 55/205* (2013.01); *B62D 55/28* (2013.01)

(58) Field of Classification Search
CPC ...... B62D 55/04; B62D 55/20; B62D 55/202; B62D 55/205; B62D 55/28; B60C 27/20; B60C 27/04; B60C 27/02
See application file for complete search history.

(56) References Cited

U.S. PATENT DOCUMENTS

| 1,942,338 | A | * | 1/1934 | Kennedy | ................ | B62D 55/04 |
| | | | | | | 152/225 R |
| 2,726,904 | A | | 12/1955 | Bekker | | |

(Continued)

FOREIGN PATENT DOCUMENTS

DE       202014103179 U1    7/2014
EP          1353835 B1      11/2007
(Continued)

*Primary Examiner* — Jason R Bellinger
(74) *Attorney, Agent, or Firm* — Laine IP Oy (57) ABSTRACT

A track assembly for a terrain going vehicles having tires, the track assembly having at least two traction bars. The traction bars each having a body that is dimensioned to extend over the width of a tire and guide plates extending from the body so that they can be set to reach over the edge of the tire and to the sides of the tires and ears at each end of each traction bar, extending crosswise on relation to the length of the traction bar and on both sides of the body of the traction bar, the ears having each at least one hole. There is at least one link having a link body with a length and one connecting hole at each opposite end of the link body, and pins set to run through a pair of one hole of the link body and at least one hole of a ear of the traction bar in order to form a chain, wherein the pins are locked in relation to the holes of the ears so that rotation of the pins in the holes is prevented.

11 Claims, 5 Drawing Sheets

(51) Int. Cl.
  *B62D 55/205*    (2006.01)
  *B62D 55/28*    (2006.01)

(56) References Cited

U.S. PATENT DOCUMENTS

| | | | |
|---|---|---|---|
| 3,738,715 A * | 6/1973 | Carlsson | B62D 55/04 305/198 |
| 4,089,565 A * | 5/1978 | Loegering | B60C 27/20 305/204 |
| 5,429,429 A | 7/1995 | Loegering et al. | |
| 5,951,124 A | 9/1999 | Hoffart | |
| 6,203,127 B1 | 3/2001 | Chapman | |
| 6,394,562 B1 * | 5/2002 | Sjostrom | B62D 55/04 152/185.1 |
| 9,630,663 B1 * | 4/2017 | Ward | B62D 55/28 |
| 2002/0021047 A1 | 2/2002 | Durick et al. | |
| 2002/0079737 A1 | 6/2002 | Doyle | |
| 2004/0016578 A1 | 1/2004 | St-Pierre et al. | |
| 2006/0232130 A1 * | 10/2006 | Hansen | B62D 55/04 305/200 |

FOREIGN PATENT DOCUMENTS

| | | | |
|---|---|---|---|
| EP | 3539853 A1 * | 9/2019 | ............ B62D 55/27 |
| JP | 3325422 B2 | 9/2002 | |
| RU | 128596 U1 | 5/2013 | |
| RU | 133087 U1 | 5/2013 | |
| RU | 170810 U1 | 5/2017 | |
| WO | WO2009040472 A1 | 4/2009 | |
| WO | WO2011142701 A1 | 11/2011 | |
| WO | WO2015053689 A1 | 4/2015 | |
| WO | WO-2019016430 A1 * | 1/2019 | ........... B62D 55/211 |
| WO | WO-2019162558 A1 * | 8/2019 | ........... B62D 55/21 |
| WO | WO-2020043954 A1 * | 3/2020 | ........... B60C 27/068 |

* cited by examiner

TRACK ASSEMBLIES FOR TERRAIN GOING VEHICLES AND METHOD FOR REPAIRING THE TRACKS

This application is a 371 of international PCT/FI2017/050676 filed Sep. 26, 2017 claiming priority to both international application PCT/FI2017/050551 filed Jul. 21, 2017 and Finnish application U020174189 filed Jul. 21, 2017.

FIELD

The invention concerns tracks for terrain going vehicles equipped with tires. Such vehicles are, for example, forestry machines such as forwarders and harvesters.

BACKGROUND

Forestry machines are usually equipped with wide rubber tires. In some circumstances tracks are needed to provide better traction and climbing ability. Tracks decrease the surface pressure whereby damage to forest ground may also decrease. Special tracks have been designed for wet and marshy condition and for snow and ice. Such tracks should give good flotation together with good cleaning properties with ejection of snow and mud. Since tracks designed for traction may clog and jam in marshy or snowy conditions, they are not suitable for terrains where good flotation is needed. On the other hand, tracks that provide good flotation do not generally have good gripping properties. For these reasons each machine must have two sets of tracks if the machine is used in varying conditions and terrains, as they usually are. Investing for two set of tracks is of course a high financial burden.

The tracks for terrain vehicles equipped with rubber tires comprise a traction bar that extends over the width of the tire and has guide plates at each end. The guide plates reach over the edge of the tire and to the sides so that they hold the tire there-between. This structure is typical for tracks designed for rubber tires as guide plates are needed for keeping the tracks on the tires. For this reason the tracks for rubber tires differ from tracks used for example in earth moving machines. The traction bars also have ears at their ends extending perpendicularly to the length of the traction bars. These ears have holes for chain links that join the traction bars together to form a complete track. In such a structure the wear is concentrated on the ears and chain links. When these parts are outworn, they have to be replaced by cutting them off from the traction bars. New parts can then be welded to replace the old ones. This repair method is quite time consuming, laborious and expensive.

Terrain going vehicles with tracks are described in documents WO 2015/053689 and WO 2009/040472.

SUMMARY OF THE INVENTION

The invention is defined by the features of the independent claims. Some specific embodiments are defined in the dependent claims.

According to a first aspect of the present invention, there is provided a track assembly for a terrain going vehicle having tires. The track assembly comprises at least two traction bars, each having a body that is dimensioned to extend over the width of a tire and have guide plates extending from the body so that they can be set to reach over the edge of the tire and to the sides of the tires, ears at each end of each traction bar, extending crosswise on relation to the length of the traction bar and on both sides of the body of the traction bar, the ears having each at least one hole for links that join the traction bars together to form a complete track. Further, there is at least one link having a link body with a length and one hole at each opposite ends of the link body, and pins set to run through a pair of one hole of the link body and one ear of the traction bar in order to form a chain, wherein the pins are locked in relation to the holes of the ears so that rotation of the pins in the holes is prevented.

According to a second aspect of the present invention, there is provided a track assembly for a terrain going vehicle having tires, the track assembly comprising at least two traction bars, each having a body that is dimensioned to extend over the width of the tire and have guide plates extending from the body so that they can be set to reach over the edge of the tire and to the sides of the tires, ears at each end of each traction bar, extending crosswise on relation to the length of the traction bar and on both sides of the body of the traction bar, the ears having each at least one hole for links that join the traction bars together to form a complete track, at least one link formed of a chain link and set to run through the holes of the ears to form a chain with the traction bars, at least one flotation bar placed between two parallel traction bars, the flotation bar having a longitudinal body and an attachment fork with at least one locking hole at each end of the longitudinal body, and a locking pin set through to each of the locking holes and connecting the attachment fork to the link between the two parallel traction bars.

According to a third aspect of the invention there is provided a method for repairing a track according to, for example, the first aspect of the invention, comprising the steps of:
  removing locking of the pins,
  removing the pins and links,
  replacing the pins and links, and
  securing the pins so that the rotation of the pins in the holes is prevented.

According to a fourth aspect of the invention there is provided a track assembly, wherein the link body is made of a single piece of material.

According to a fifth aspect of the invention there is provided a track assembly comprising at least one flotation bar placed between two parallel traction bars, the flotation bar having a longitudinal body and an attachment fork with at least one locking hole at each end of the longitudinal body, and a locking pin set through to each of the locking holes and connecting the attachment fork to the link between the two parallel traction bars.

According to a sixth aspect of the invention there is provided a track assembly, wherein the attachment fork comprises two parallel extensions having the locking holes at their respective ends, the extension being placed at a distance from each other so that there is a gap between the extensions and gap is dimensioned to accommodate the link so that a link placed in the gap sets between locking pin set in locking holes and bottom of the gap.

EMBODIMENTS

Definitions

In the present context, the term track assembly comprises full closed tracks and partial lengths of such tracks.

Lengthwise direction of the track assembly is the direction of the centreline of the longitudinal direction of the track.

Crosswise direction of the track assembly is crosswise to the lengthwise direction and same as length wise direction of the traction bars.

Forestry machines are usually equipped with wide rubber tires. In some circumstances tracks are needed to provide better traction and climbing ability. Different types of tracks are needed for different terrain conditions. One aspect of this invention is to provide a track assembly that can be accommodated to different terrain conditions simply by attaching accessories to the basic track. These parts may be designed to provide better flotation in marshy or snowy condition or better traction when it is needed or a combination of these properties. The idea of changing the properties of the track assembly by adding or removing accessories allows high flexibility and reduces cost as only one track with suitable accessories is needed instead of two or more tracks. Another feature of the invention is use of links and locking pins for making the track chain. By locking the rotation of the pins wear can be focused on easily changeable parts. Thus maintenance and repair of the track assembly is cost effective and fast compared to earlier methods.

Figure 1:
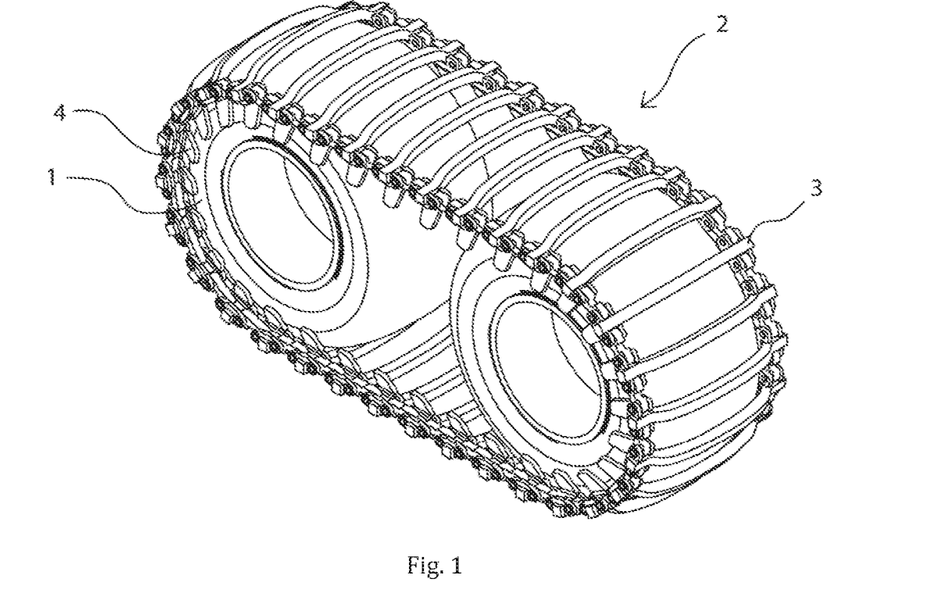
FIG. 1 illustrates a set of tires equipped with first track assembly in accordance with at least some embodiments of the present invention.

FIG. 1 illustrates a set of tires equipped with a track assembly in accordance with at least some embodiments of the present invention. The set of tires has in this example two tires 1, which are in forestry machines usually rubber terrain tires set on metal spokes. The track assembly 2 comprises traction bars 3 that are perpendicular to length direction of the track assembly 1. The purpose of the traction bars 3 is to provide good grip on the ground or any surface the vehicle is moving. The traction bars 3 are usually made of steel and various manufacturers have own specifications for the shape of the bar. The length of the traction bar 3 is set so that it extends over the width of a tire and depends thus on the dimension of the tires. The traction bars 3 have guide plates 4 at each end of the traction bar 3. The purpose of the guide plates 4 is to keep the track assembly 1 on the tires 1. As tires 1 don't have guide surfaces or grooves as wheels used with caterpillar tracks do, the track assembly suitable for tires has to be guided at the edges of the tires 1 in order to keep the track assembly 2 on the tires even in difficult terrain conditions.

Figure 2:
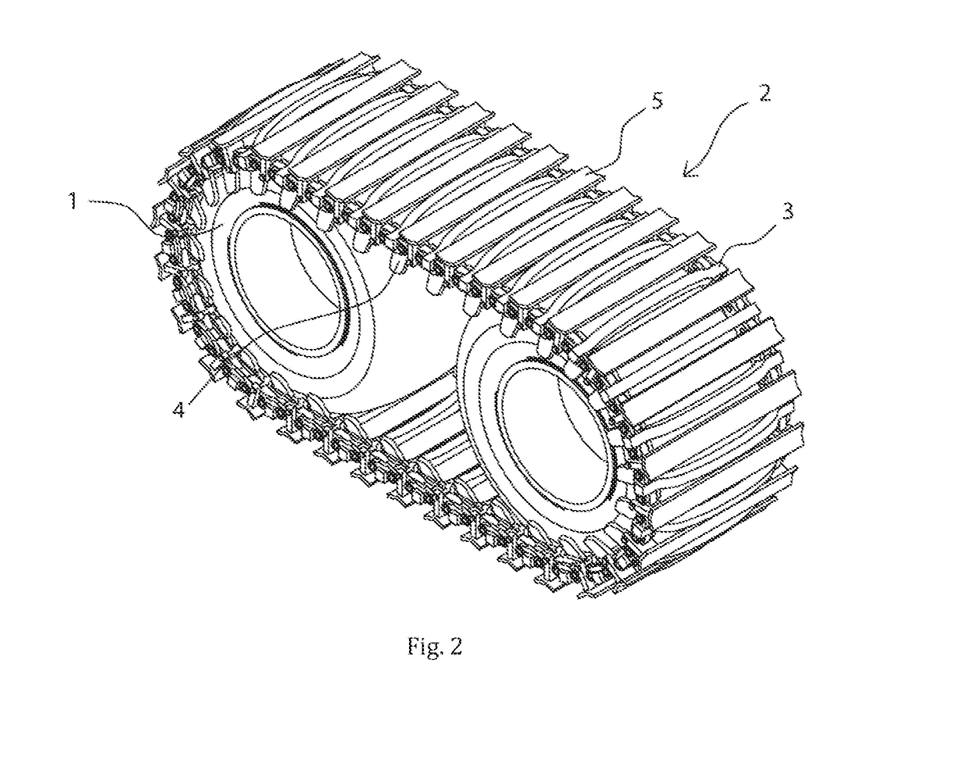
FIG. 2 illustrates a set of tires equipped with second track assembly in accordance with at least some embodiments of the present invention.
Figure 3:
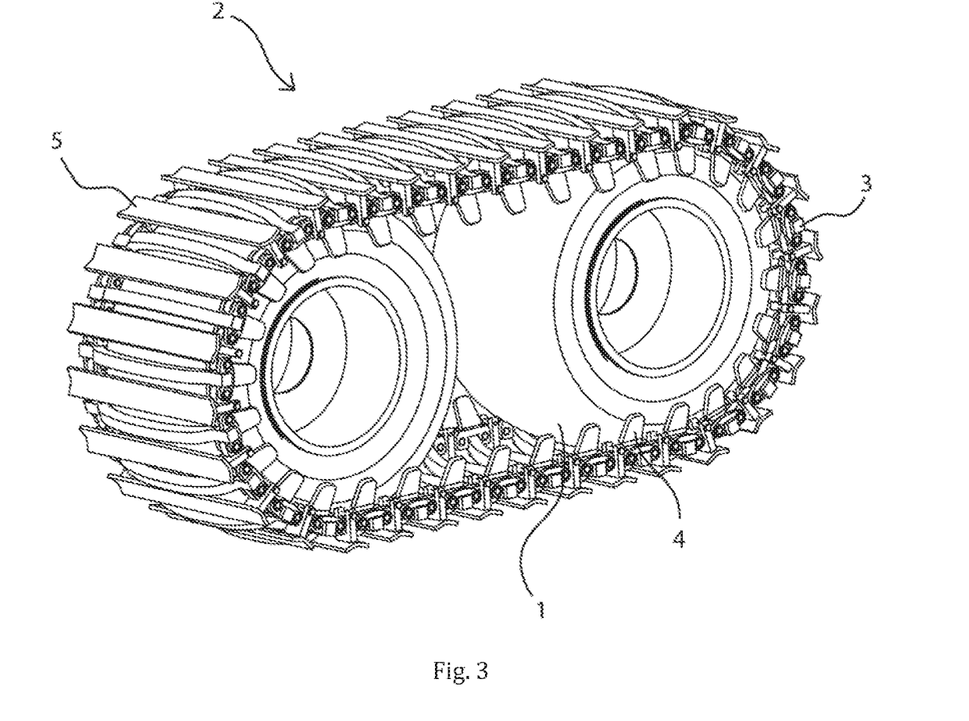
FIG. 3 is an enlarged view of FIG. 2.

FIGS. 2 and 3 illustrate the same track as in FIG. 1 but equipped with flotation bars 5. The flotation bars 5 are set between two parallel traction bars 3. Usually the flotation bars 5 are used in every gap between two parallel traction bars 3 but it can be contemplated that smaller number of flotation bars are used and some gaps are left empty. This way the balance between traction ability and surface pressure can be adjusted, if needed or desired.

Figure 4:
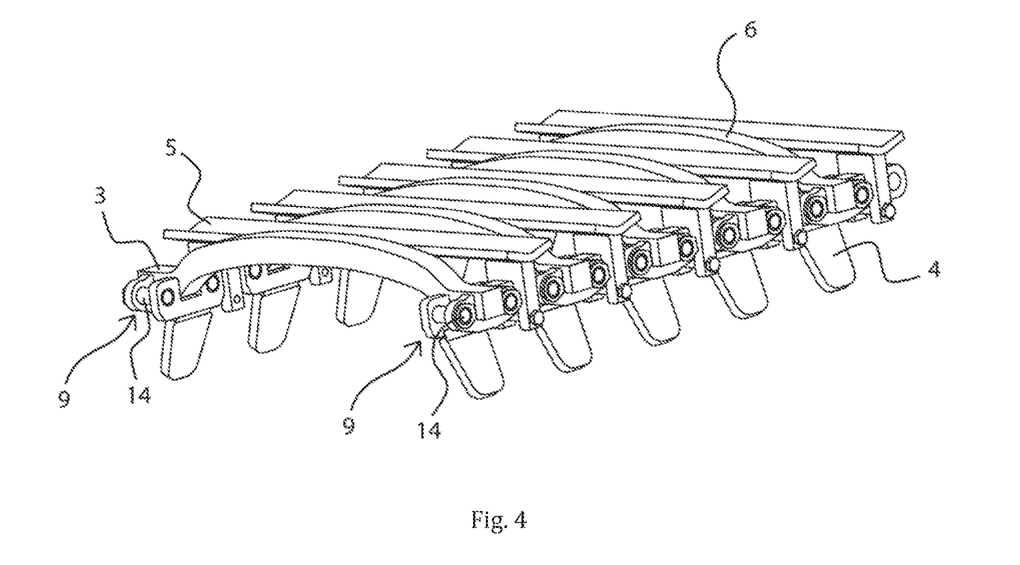
FIG. 4 illustrates a track assembly in accordance with at least some embodiments of the present invention.
Figure 5:
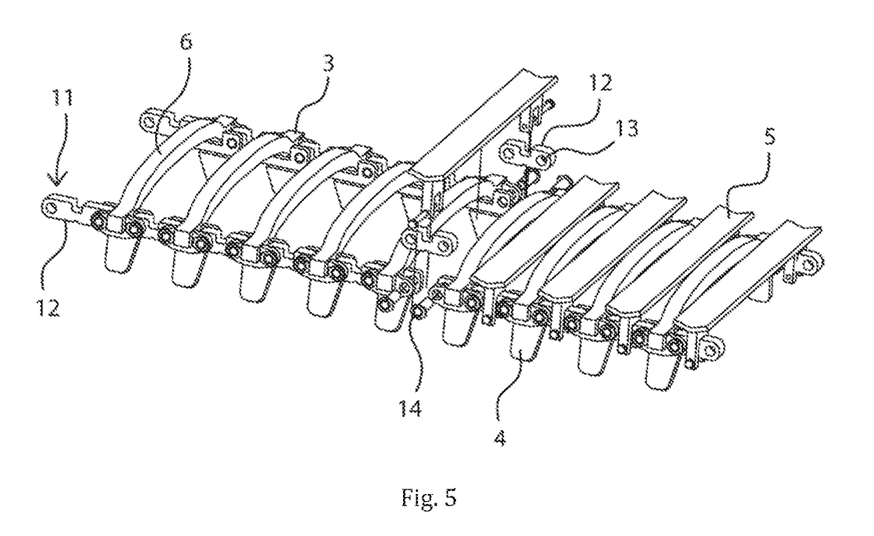
FIG. 5 is a partially exploded view of a track assembly of FIG. 4.
Figure 6:
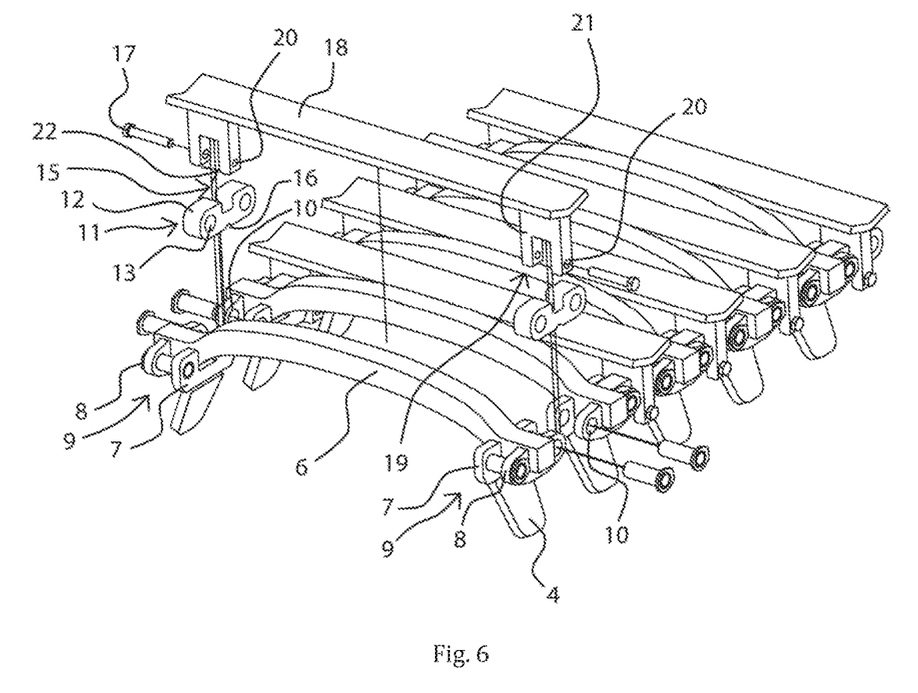
FIG. 6 is an enlarged partially exploded view of a track assembly shown in FIG. 4.

The structure of the track assembly 2 is described in the following with reference to FIGS. 4-6. A track assembly 2 for a terrain going vehicle having tires 1 according to example in these figures comprises at least two traction bars 3, each having a body 6 that is dimensioned to extend over the width of a tire 1. The body 6 is curved so that it accommodates the outer shape of the tire 1 and provides an extension in crosswise direction of the rotation direction of the wheel. The crosswise extension and detailed shape of the body 6 may vary according to design preferences of the manufacturer. The body 6 has guide plates 4 extending from the body 6 so that they can be set to reach over the edge of the tire 1 and to the sides of the tires 1. The guide plates 4 are flat plates that extend in an obtuse angle from the distal ends of the body 6 so that the body 6 and the guide plates 4 form an opening U-shape to accommodate the tire 1. The shape of the guide plates 4 can be varied.

The body 6 comprises a set of four ears 7, 8 at each end of each traction bar 3 extending crosswise on relation to the length of the traction bar 3. The ears are set on both sides of the body 6 of the traction bar 3 so that a pair of ears 7, 8 is on each opposite sides of the end of the body 6. The ears 7, 8 are directed to extend in the lengthwise direction of the track assembly. The set of ears comprise inner ears 7 set opposite each other on the body 6 and outer ears 8 set at a distance from the inner ears 7 towards the ends of the body 6. The pair of inner ear 7 and outer ear form a slot 9 that is directed in the lengthwise direction of the track assembly 1. The guide plates 4 may be joined with inner ears 7 or made as a separate structure.

The ears 7, 8 have each at least one hole 10 for connecting to links 11 that join the traction bars 3 together to form a complete track assembly. The link 11 has a link body 12 with a length and one connecting hole 13 at each opposite end of the link body 12. The track assembly 2 is constructed by connecting traction bars 3 with links 11 and pins 14. The pins 14 are set to run through a pair of one connecting hole 13 of the link body 12 and a hole 10 in inner ear 7 and outer ear 8 of the traction bar 3 in order to form a track chain. The pins 14 are locked in relation to the holes 10 of the ears 7, 8 so that rotation of the pins 14 in the holes 14 is prevented. The locking of the pins 14 can be accomplished simply by welding the pins to at least one of the ears 7, 8. Alternatively the locking may be accomplished by using locking grooves and wedges or other shapes that prevent rotation of the pin 14 in the hole 10.

The link 11, or more precisely the link body, is made of a single piece of material, for example steel. The link 11 is very simple and easy to manufacture. As can be seen from FIG. 6, the link body 12 has two grooves 15, 16 running crosswise to the length of the link body 12 in the middle of it length. The larger of the grooves is a positioning groove 15 and the smaller is a groove 16 for the locking pin 17. This shape facilitates mounting of flotation bars 5 on the links 11.

The flotation bars 5 comprise a longitudinal body part 18 and an attachment fork 19 with at least one locking hole 20 at each end of the longitudinal body part 18. The locking pin 17 is set through to the locking holes 20 to connect the attachment fork 19 to the link 11 between two parallel traction bars 3. Usually at least at least one flotation bar 5 is placed between two parallel traction bars 3. The longitudinal body part 18 can have various shapes depending on what kind of traction or flotation properties are needed. The opening v-shape shown in FIGURES provides good flotation and resists clogging of the track assembly. Protruding sawtooth shapes, spikes or gripping scoops may be used in circumstances where extreme traction and gripping power is needed. The possibility to use various shapes of flotation bars provides for high flexibility without the need for several specialized tracks.

One embodiment of the attachment fork 19 comprises two parallel extensions 21 having the locking holes 20 at their respective ends, the extensions 21 being placed at a distance from each other so that there is a gap 22 between the extensions 21. The gap 22 is dimensioned to accommodate the link 11 so that a link placed in the gap 22 sets between locking pin 17 set in locking holes 20 and bottom of the gap 22. Now the bottom of the gap 22 is on the positioning groove 15 that holds the attachment fork 19 and whole flotation bar 5 in place. The groove for locking pin 16 accommodates the locking pin 17. Instead of a groove the link may comprise a hole for the locking pin 17.

Figure 7:
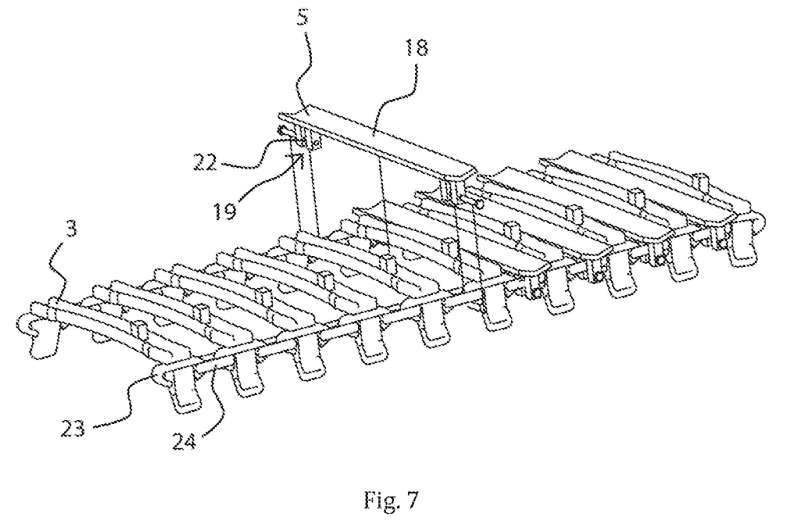
FIG. 7 illustrates an embodiment of a track assembly in accordance with at least some embodiments of the present invention.

FIG. 7 illustrates a track assembly wherein the links are formed of chain links 24. The ears of the traction bars 3 are loops 23 that are compatible to traditional chain links 24. The chain links 24 are set to run through the holes of the loops 23 to form a chain with the traction bars 3. Flotation bars 5 are mounted on the chain links 24 through attachment forks 19 and secured with locking pins 17.

A method for repairing a track assembly comprises steps of removing locking of the pins 9. For example, if pins 9 are secured by welding, welding is cut open, where-after removing the pins 17 and links 11 can be done simply by pulling the pins from the holes. After this, the whole track assembly is disassembled. Assembly is done in opposite order by replacing the pins and links and securing the pins so that the rotation of the pins in the holes is prevented, for example by welding. If a securing system other than welding is used, disassembly and assembly may involve opening bolts and nuts, securing rings or pins and such.

Figure 8:
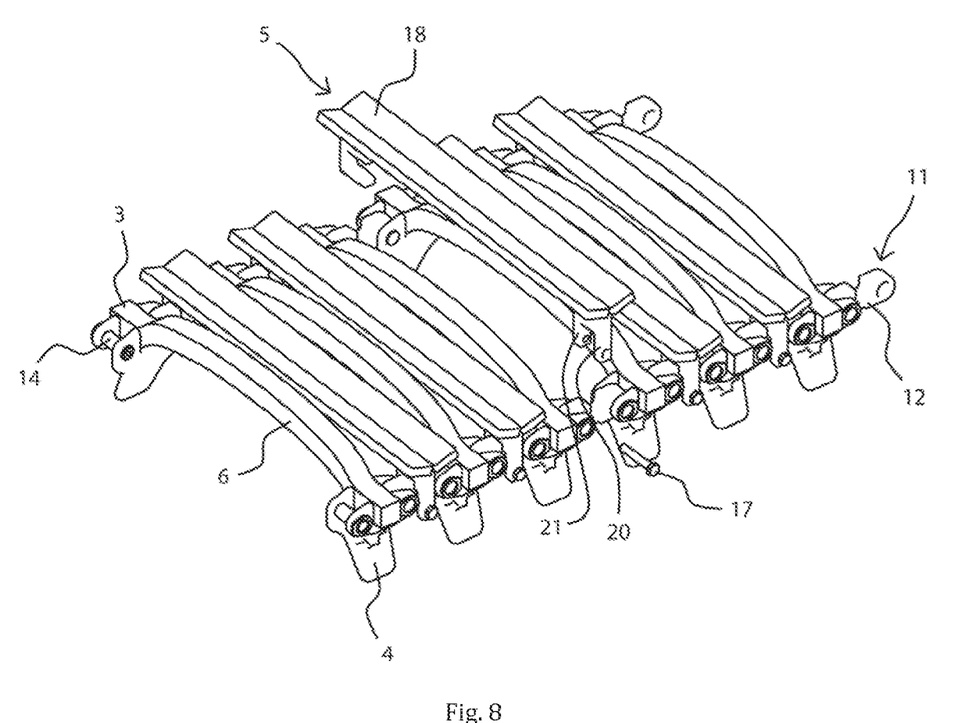
FIG. 8 illustrates an embodiment of a track assembly in accordance with at least some embodiments of the present invention.

The assembly in FIG. 8 shows a track assembly with an alternative type of a flotation bar 5. This flotation bar 5 comprises a longitudinal body part 18 and a similar attachment fork 19 as described above in one end. At the opposite end to the attachment fork 19 is a hook 25 formed of a hook body 26 and a notch 27 facing towards the attachment fork 19. The notch 27 forms the hook 25 at the end of the hook body 26.

The idea of the hook 25 is to simplify the structure and assembling of the track. Now the hook 25 can be placed around a link 11 or a chain link 24 in a track assembly and the attachment fork 19 over the link 11 or a chain link 24 on the other side of the track assembly. Only one locking pin 17 is needed when this type of flotation bar is used. In FIG. 8 this type of flotation bar 5 is shown in a track assembly of FIG. 6 but would be suitable for track assemblies of FIG. 7 also or other type of track assemblies having links connecting the traction bars 3.

Figure 9:
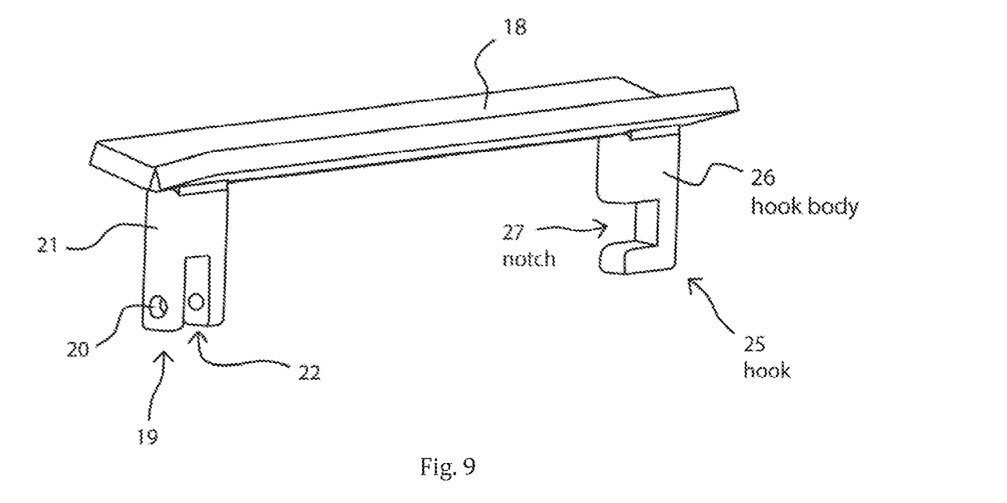
FIGS. 9 and 10 illustrate flotation bars shown in FIG. 8.
Figure 10:
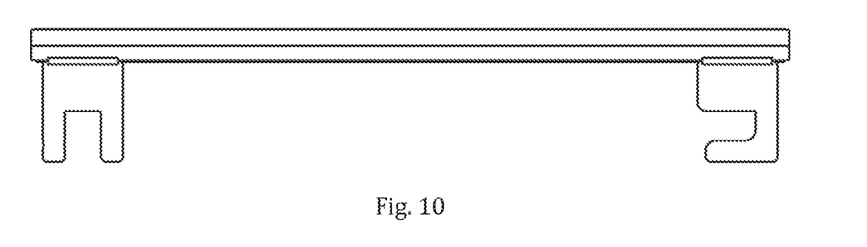

FIGS. 9 and 10 further illustrate the flotation bars shown in FIG. 8.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The invention has industrial applicability in forestry and manufacture, maintenance and repair of equipment for forestry.

REFERENCE SIGNS LIST 1 tire
2 track assembly
3 traction bar
4 guide plate
5 flotation bar
6 body
7 inner ear
8 outer ear
9 slot 10 hole
11 link
12 link body
13 connecting hole
14 pin
15 positioning groove
16 groove for locking pin
17 locking pin
18 longitudinal body part
19 attachment fork
20 locking hole
21 extension
22 gap
23 loop
24 chain link
25 hook
26 hook body
27 notch

CITATION LIST

Patent Literature

WO 2015/053689
WO 2009/040472

The invention claimed is:

1. A track assembly for a terrain going vehicle having tires, the track assembly comprising:
   at least two traction bars, each having a body that is dimensioned to extend over the width of a tire and guide plates extending from the body so that the guide plates can be set to reach over the edge of the tire and to the sides of the tires,
   ears at each end of each traction bar, extending crosswise in relation to the length of the traction bar and on both sides of the body of the traction bar, the ears having each at least one hole,
   at least one link having a link body with a length and one connecting hole at each opposite end of the link body,
   pins set to run through a pair of one hole of the link body and at least one hole of one of the ears of the traction bar in order to form a chain, wherein the pins are locked in relation to the holes of the ears so that rotation of the pins in the holes is prevented,
   at least one flotation bar placed between two parallel traction bars, the flotation bar having a longitudinal body and an attachment fork with at least one locking hole at least at one end of the longitudinal body and an attachment element in the opposite end of the longitudinal body, and
   a locking pin set through at least one of the locking holes and connecting the attachment fork to the link between the two parallel traction bars.

2. The track assembly according to the claim 1, wherein the link body is made of single piece of material.

3. The track assembly according to the claim 1, wherein the flotation bar has a longitudinal body and an attachment fork with at least one locking hole at each end of the longitudinal body, wherein the locking pin is set through the locking hole at one end of the longitudinal body and a further locking pin is set through the locking hole at the other end of the longitudinal body connecting the attachment fork to the link between the two parallel traction bars.

4. The track assembly according to the claim 1, wherein the flotation bar has a longitudinal body and an attachment fork with at least one locking hole at one end of the longitudinal body, and a hook at the opposite end of the longitudinal body, wherein the locking pin is set through the locking hole at one end of the longitudinal body and a further locking pin is set through the locking hole at the other end of the longitudinal body connecting the attachment fork to the link between the two parallel traction bars.

5. The track assembly according to claim 1, wherein the attachment fork comprises two parallel extensions having the locking holes, the extensions being placed at a distance from each other so that there is a gap between the extensions and the gap is dimensioned to accommodate the link so that a link placed in the gap sits between the locking pin set in the locking holes and the bottom of the gap.

6. The track assembly according to claim 5, wherein the link body comprises a groove for the locking pin.

7. The track assembly according to claim 5, wherein the link body comprises a hole for the locking pin.

8. The track assembly according to the claim 4, wherein the hook comprises a hook body extending from one end of a longitudinal body of the hook and a notch facing the opposite end of the longitudinal body of the hook and forming the hook.

9. A track assembly for a terrain going vehicle having tires, the track assembly comprising:
   at least two traction bars, each having a body that is dimensioned to extend over the width of the tire and have guide plates extending from the body so that the guide plates can be set to reach over the edge of the tire and to the sides of the tires,
   ears at each end of each traction bar, extending crosswise in relation to the length of the traction bar and on both sides of the body of the traction bar, the ears having each at least one hole,
   at least one link formed of a chain link and set to run through the holes of the ears to form a chain with the traction bars,
   at least one flotation bar placed between two parallel traction bars, the flotation bar having a longitudinal body and an attachment fork with at least one locking hole at each end of the longitudinal body, and
   a locking pin set through to each of the locking holes and connecting the attachment fork to the link between the two parallel traction bars.

10. The track assembly according to claim 9, wherein the attachment fork comprises two parallel extensions having the locking holes, the extensions being placed at a distance from each other so that there is a gap between the extensions and the gap is dimensioned to accommodate the link so that a link placed in the gap sits between the locking pin set in the locking holes and the bottom of the gap.

11. A method for repairing the track assembly according to claim 1, the method comprising the steps of:
   removing the pins and links,
   replacing the pins and links, and
   securing the pins so that the rotation of the pins in the holes is prevented.

* * * * *